(12) United States Patent
Wang et al.

(10) Patent No.: US 12,129,178 B2
(45) Date of Patent: Oct. 29, 2024

(54) PREPARATION METHOD OF SSZ-13 ZEOLITE MEMBRANE

(71) Applicant: NANJING TECH UNIVERSITY, Jiangsu (CN)

(72) Inventors: Xuerui Wang, Suzhou (CN); Xingyu Peng, Suzhou (CN); Lekai You, Suzhou (CN); Shengyuan Ren, Suzhou (CN); Wen Bo, Suzhou (CN); Xuehong Gu, Suzhou (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/418,344

(22) Filed: Jan. 22, 2024

(65) Prior Publication Data
US 2024/0253998 A1     Aug. 1, 2024

(30) Foreign Application Priority Data
Jan. 31, 2023 (CN) .......................... 202310081303.X

(51) Int. Cl.
C01B 39/04 (2006.01)
(52) U.S. Cl.
CPC .................................. C01B 39/04 (2013.01)
(58) Field of Classification Search
None
See application file for complete search history.

(56) References Cited

PUBLICATIONS

Zhao et al., Sodium persulfate promoted interzeolite transformation of USY into SSZ-13 via a solid-state grinding route and its enhanced catalytic lifetime in the methanol-to-olefins reaction, Reaction Kinetics, Mechanisms and Catalysis, 2021, 134:837-849 (Year: 2021).*
Liang et al., Single gas permeance performance of high silica SSZ-13 zeolite membranes, Membranes, 2018, 8, 43 (Year: 2018).*
Kosinov et al., High flux high-silica SSZ-13 membrane for CO2 separation, J. Mater. Chem. A, 2014, 2, 13083 (Year: 2014).*
Nikolay Kosinov et al., "High flux high-silica SSZ-13 membrane for CO2 separation", Journal of Materials Chemistry A, Jun. 2014, pp. 1-11.
Ming Zhou et al., "Ultrathin DDR Films with Exceptionally High CO2 Flux and Uniformly Adjustable Orientations", Advanced Functional Materials, Jan. 2022, pp. 1-8.

* cited by examiner

*Primary Examiner* — Melissa S Swain
*Assistant Examiner* — Keling Zhang
(74) *Attorney, Agent, or Firm* — JCIPRNET

(57) ABSTRACT

A preparation method of an SSZ-13 zeolite membrane is provided, and the SSZ-13 zeolite membrane belongs to the technical field of zeolite membranes. The problem that the SSZ-13 zeolite membranes synthesized in the art have a poor quality and a large thickness is solved. A FAU-type zeolite is used as a raw material, and transformed into an SSZ-13 zeolite with a particle size of 210 nm through intergranular transformation, with a mass yield of 91.2%. A crystal seed prepared by the preparation method has a small particle size and a small thickness.

6 Claims, 6 Drawing Sheets

PREPARATION METHOD OF SSZ-13 ZEOLITE MEMBRANE

CROSS-REFERENCE TO RELATED APPLICATION

This application claims the priority benefit of China application serial no. 202310081303.X, filed on Jan. 31, 2023. The entirety of the above-mentioned patent application is hereby incorporated by reference herein and made a part of this specification.

BACKGROUND

Technical Field

The present disclosure relates to a preparation method of an SSZ-13 zeolite membrane, and belongs to the technical field of zeolite membranes.

Description of Related Art

A secondary growth method is the most common method for preparing a zeolite membrane. In principle, an original crystal, as a seed, should have a small and uniform particle size, such that the original seed can be evenly packed on a porous substrate. In this case, interstitial zones requiring interconnected growth are reduced, which may reduce a thickness of a membrane. A first-generation SSZ-13 zeolite membrane induced by a micro-scale crystal seed (2 μm to 5 μm) has a thickness of 10 μm to 40 μm. Kosinov et al.[1] reduce a membrane thickness to 4 μm to 6 μm by introducing an SSZ-13 zeolite seed with a particle size of 120 nm. Recently, Zhou et al.[2] provide a ball milling method to obtain DD3R zeolite with a particle size of 60 nm, which can reduce a membrane thickness to 0.5 μm.

However, even after 15 ball milling-centrifugation cycles, a yield of a crystal seed is merely 20%. In addition, zeolite seeds are easily contaminated by impurity elements etched from a centrifugation tank/balls.

[1] N. Kosinov, C. Auffret, C. Gucuyener, B. M. Szyja, J. Gascon, F. Kapteijn, E. J. M. Hensen, High flux high-silica SSZ-13 membrane for $CO_2$ separation, J Mater Chem A 2(32) (2014) 13083-13092.

[2] M. Zhou, L. Yu, J. Hedlund, Ultrathin DDR films with exceptionally high $CO_2$ flux and uniformly adjustable orientations, Adv Funct Mater 32(18) (2022) 2112427.

SUMMARY

An objective of the present disclosure is to synthesize an SSZ-13 zeolite membrane with nanocrystalline zeolite obtained through interzeolite conversion of FAU-type zeolite as a crystal seed. N,N,N-trimethyl-1-adamantane ammonium hydroxide (TMAdaOH) is adopted as an organic structure-directing agent (OSDA), and a single precrystallized FAU-type zeolite is adopted as Si and Al sources. The SSZ-13 zeolite membrane is prepared on a four-channel hollow fiber by a secondary growth method. A seeding process is optimized to obtain a continuous SSZ-13 nanoseed layer. Impacts of a seed type, a seed concentration, and a synthesis time on properties of the membrane are investigated to obtain a process for preparing a membrane with stable $CO_2/CH_4$ separation performance, and the process is successfully used in preparation of a 40 cm-long membrane.

A preparation method of an SSZ-13 zeolite membrane is provided, including the following steps:

step 1: subjecting a FAU-type USY zeolite to a hydrothermal reaction under an action of a structure-directing agent to obtain a high-silica CHA zeolite, separating the high-silica CHA zeolite through high-speed centrifugation, and calcining the high-silica CHA zeolite to obtain a seed; and step 2: preparing the crystal seed into a crystal seed suspension, and applying the crystal seed suspension to a surface of a substrate; and placing the substrate in a synthesis solution to allow hydrothermal synthesis, and calcining the substrate to remove a template agent, to obtain the SSZ-13 zeolite membrane, where the SSZ-13 zeolite membrane has a thickness of 1 μm to 5 μm; and the structure-directing agent is N,N,N-trimethyl-1-adamantane ammonium hydroxide (TMAdaOH).

During the hydrothermal reaction in the step 1, the FAU-type USY zeolite serves as a silicon source and an aluminum source, and a molar ratio of components in a reaction solution is 100 $SiO_2$:1.25 $Al_2O_3$:(300-500) TMAdaOH:(400-600) $H_2O$.

The hydrothermal reaction in the step 1 is conducted at 150° C. to 200° C. for 10 d to 20 d.

The calcining in the step 1 is conducted at 550° C. to 650° C. for 5 h to 20 h with a heating rate of 1° C./min to 5° C./min.

In the step 2, the seed suspension has a concentration of 0.1 wt % to 1 wt % and preferably 0.4 wt % to 0.6 wt %, a contact time between the seed suspension and the substrate is 1 s to 30 s, and the substrate is a porous ceramic.

In the step 2, the hydrothermal synthesis is conducted at 140° C. to 180° C. for 70 h to 120 h.

In the step 2, a molar ratio of components in the synthesis solution is 100 $SiO_2$:(0.45-0.55) $Al_2O_3$:(15-25) TMAdaOH:(8-16) $Na_2O$:(3,500-5,500) $H_2O$.

In the step 2, the calcining to remove the template agent is conducted at 450° C. to 500° C. for 12 h to 36 h with heating and cooling rates both of 0.2° C./min to 1° C./min.

A method for reducing a thickness of a synthesized zeolite membrane is provided, including the following steps:

step 1: adding a crystal seed to a synthesis solution, and conducting a hydrothermal reaction; and measuring crystallinity of seeds obtained under different reaction conditions, and determining conversion times required for a crystalline structure to appear in an amorphous structure; and step 2: determining synthesis conditions allowing a minimum conversion time as preparation conditions for synthesis of a zeolite membrane with a minimum thickness.

A molar ratio of components in the synthesis solution is 100 $SiO_2$:(0.45-0.55) $Al_2O_3$:(15-25) TMAdaOH:(8-16) $Na_2O$:(3,500-5,500) $H_2O$.

A concentration of the seed in the synthesis solution is 1 wt % to 5 wt %.

The different reaction conditions refer to different seeds, and the zeolite membrane refers to an SSZ-13 zeolite membrane.

The zeolite membrane is prepared as follows: preparing a seed into a crystal seed suspension, and applying the crystal seed suspension to a surface of a substrate; and placing the substrate in a synthesis solution to allow hydrothermal synthesis, and calcining the substrate to remove a template agent to obtain the SSZ-13 zeolite membrane.

Beneficial Effects

The present disclosure solves the problem that the SSZ-13 zeolite membranes synthesized in the art have a poor quality and a large thickness. In the present disclosure, a FAU-type zeolite is used as a raw material, and transformed into an SSZ-13 zeolite with a particle size of 210 nm through intergranular transformation, with a mass yield of 91.2%. A crystal seed prepared by the preparation method of the present disclosure has a small particle size and a small thickness.

DESCRIPTION OF THE EMBODIMENTS

The following SSZ-13 zeolite membranes were prepared by a secondary growth method with three crystal seeds, i.e., Seed A, Seed B, and Seed C. Preparation processes of the crystal seeds were as follows:

Seed A:

According to the process in "H. Liu, X. Gao, S. Wang, Z. Hong, X. Wang, X. Gu, SSZ-13 zeolite membranes on four-channel α-$Al_2O_3$ hollow fibers for $CO_2$ separation, Sep Purif Technol 267 (2021) 118611.", a synthesis solution with components in a ratio of 105 $SiO_2$:1.05 Al(OH)$_3$:20 TMAdaOH:23.62 NaOH:4,400 $H_2O$ was taken, a small amount of a crystal seed was added, and synthesis was conducted at 160° C. for 4 d; and then a resulting system was centrifuged in a high-speed centrifuge to separate a solid zeolite, and the solid zeolite was washed with deionized water, dried at 60° C., and finally calcined at 600° C. for 12 h with heating and cooling rates both of 2° C./min to obtain the Seed A with an average particle size of 660 nm.

Seed B:

The Seed A was subjected to mechanical wet ball-milling to obtain the Seed B with an average particle size of 360 nm.

Seed C:

A commercial USY zeolite (FAU-type) was adopted as a silicon/aluminum source, and TMAdaOH was adopted as a structure-directing agent. A synthesis solution with components in a ratio of 100 $SiO_2$:1.25 $Al_2O_3$:400 TMAdaOH:500 $H_2O$ was allowed to stand in an oven at 175° C. for 16 d to obtain a crystal seed, and the crystal seed was calcined at 600° C. for 12 h with heating and cooling rates both of 2° C./min to obtain the Seed C.

The three crystal seeds each were dispersed in deionized water in mass ratios of 0.1%, 0.5%, and 1% to obtain crystal seed suspensions.

Synthesis steps of zeolite membranes: SSZ-13 zeolite membranes A, B, and C were prepared by a secondary growth method with the Seeds A, B, and C, respectively. A four-channel α-$Al_2O_3$ hollow fiber with an outer diameter of 3.6 mm, an inner diameter of 0.9 mm, a length of 7 cm, a porosity of about 50%, and an average pore size of 300 nm was adopted as a substrate. Before low-temperature synthesis, the hollow fiber was soaked in the crystal seed suspension for 15 s. A synthesis solution with components in a molar ratio of 100 $SiO_2$:0.525 $Al_2O_3$:20 TMAdaOH:11.81 $Na_2O$:4,400 $H_2O$ was adopted. In the synthesis solution, a silica sol was adopted as a silicon source and aluminum hydroxide was adopted as an aluminum source. Crystallization was conducted at 433 K for 96 h, and a resulting product was washed with deionized water, then dried overnight at 373 K, and then calcined in air at 480° C. for 24 h with heating and cooling rates both of 0.5° C./min to remove a template agent.

Crystal Seed Characterization

Figure 1:
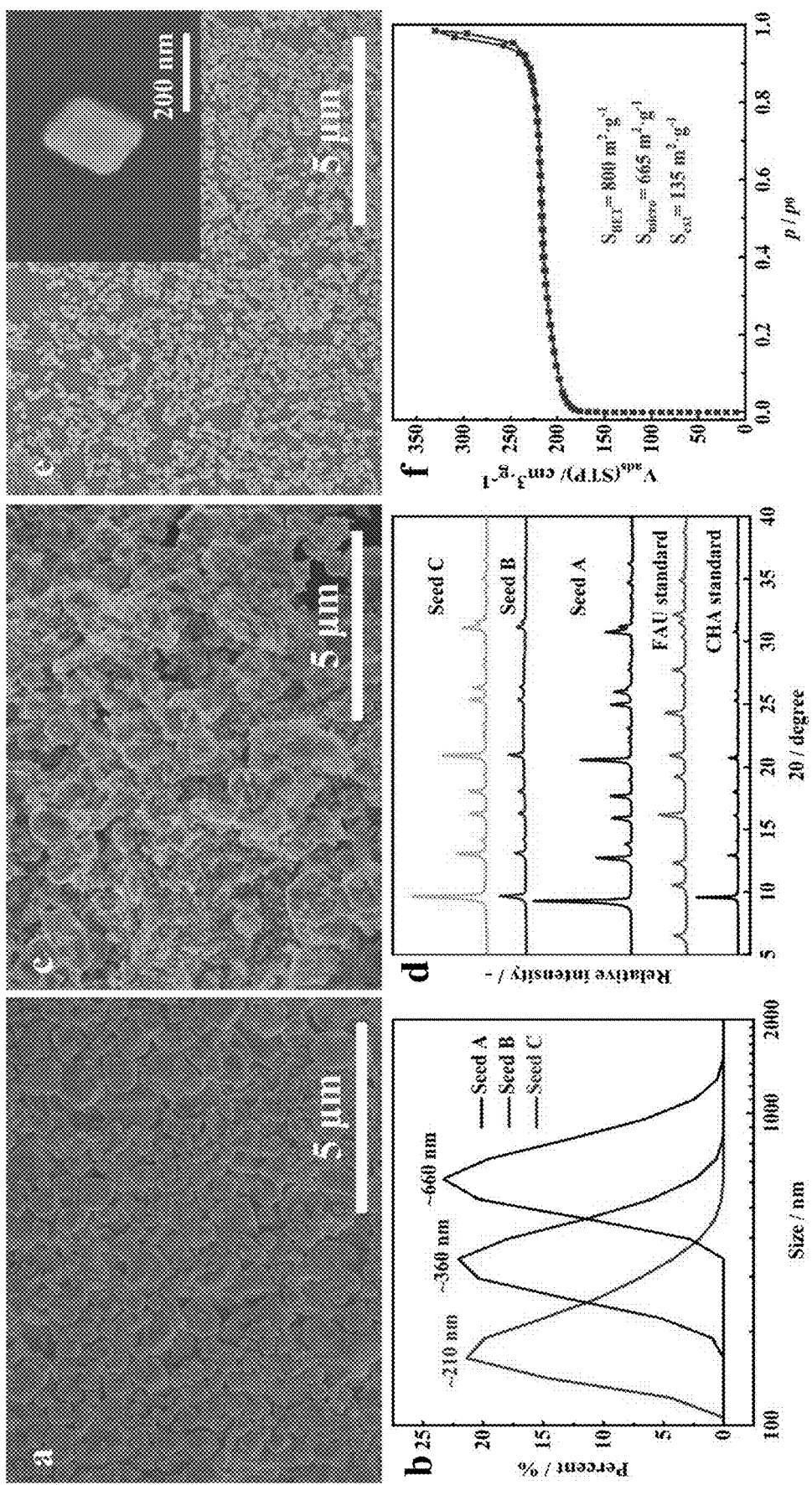
FIG. 1 shows characterization results of high-silica CHA zeolite crystal Seeds A to C, where a, c, and e are scanning electron microscopy (SEM) images of the high-silica CHA zeolite crystal Seeds A to C (i.e., Seed A, Seed B, and Seed C), respectively; (b) shows particle size distributions of the high-silica CHA zeolite crystal Seeds A to C determined by dynamic light scattering (DLS); (d) shows powder X-ray diffraction (PXRD) patterns of the high-silica CHA zeolite crystal Seeds A to C; and (f) shows a $N_2$ adsorption-desorption isotherm of the high-silica CHA zeolite crystal Seed C at 77 K.

Seeds A, B, and C were prepared by the three respective methods. The Seed A had a cube-like shape (zone a in FIG. 1) and an average particle size of 660 nm (zone b in FIG. 1). The Seed B had an average particle size of 360 nm due to effective crystal breaking of ball-milling, but there were still large crystals, which even dominate an SEM image (zone c of FIG. 1). After ball-milling, the large crystals were removed through purification. The Seed C prepared through intergranular transformation of an FAU-type zeolite had a typical cubic shape and a uniform particle size of about 210 nm (zone e of FIG. 1). PXRD spectra of the crystal seeds all are identical to a PXRD spectrum of a standard CHA zeolite (zone d of FIG. 1), indicating the successful synthesis of SSZ-13 zeolite crystal seeds. In particular, a diffraction peak unique to the FAU-type zeolite is not found in a PXRD spectrum of the Seed C, indicating that the FAU-type zeolite had been completely transformed into a CHA zeolite. The N$_2$ isotherm of the Seed C is a typical Langmuir-type curve (zone f of FIG. 1), and the Seed C had a comparable micropore volume of 0.26 cm$^3$ g$^{-1}$ to a micro-scale SSZ-13 zeolite. However, an SSZ-13 zeolite converted from an FAU-type zeolite with benzyltrimethylammonium hydroxide as a structure-directing agent had a high specific surface area (BET) of 630 m$^2$·g$^{-1}$, which was higher than a specific surface area of micro-scale SSZ-13 zeolite (800 m$^2$·g$^{-1}$ vs 700 m$^2$·g$^{-1}$ to 740 m$^2$·g$^{-1}$). The Seed C had an external surface area of 135 m$^2$·g$^{-1}$, while the micro-scale CHA zeolite merely had an external surface area of 14 m$^2$·g$^{-1}$ to 29 m$^2$·g$^{-1}$. An external surface area of an embryonic and X-ray amorphous CHA material with a particle size of 10 nm to 20 nm even increased to 220 m$^2$·g$^{-1}$. Based on a mass of an FAU-type zeolite, a yield reached 91.2%, providing an efficient method for expanding a monodispersed and highly-crystallized SSZ-13 zeolite crystal seed.

TABLE 1

Synthesis and characterization of crystal seeds

| Seed | Molar composition | | | | | Crystal-linity[b]/ % | Particle size[c]/nm | SAR[d] |
|---|---|---|---|---|---|---|---|---|
| | SiO$_2$ | Al$_2$O$_3$ | TMAda$^+$ | Na$_2$O | H$_2$O | | | |
| A | 105 | 0.525 | 20 | 23.62 | 4400 | 100 | 660 | 106 |
| B | 105 | 0.525 | 20 | 23.62 | 4400 | 29.94 | 360 | 106 |
| C | 1 | 0.0125 | 4 | — | 5 | 92.52 | 210 | 25.7 |

[a]the FAU-type zeolite is a source of silica and alumina;
[b]a relative crystallinity of Seed A;
[c]DLS measurement; and
[d]SAR obtained by an ICP method.

Impacts of the Crystal Seeds on Preparation of a Membrane

Figure 2:
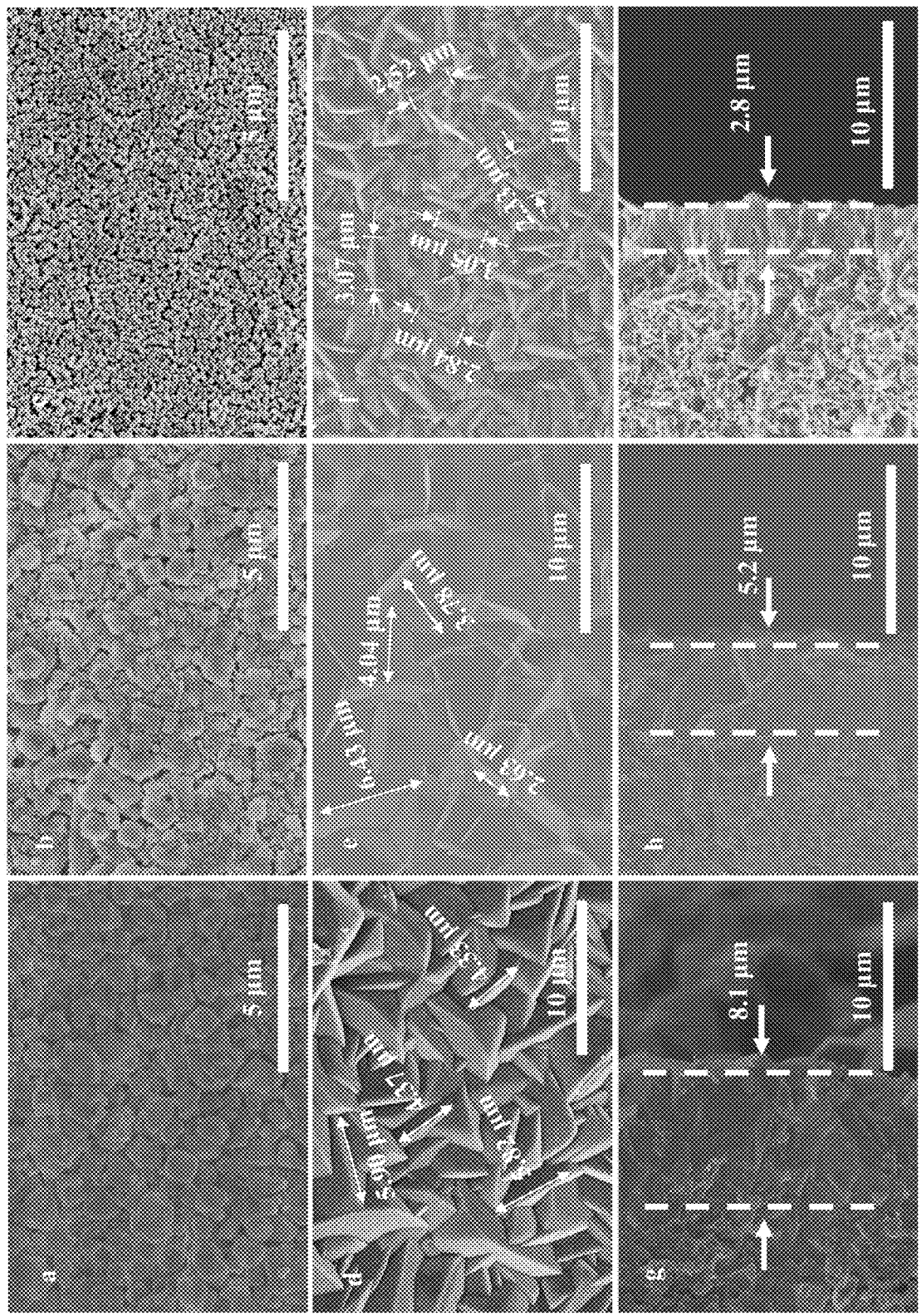
FIG. 2 shows impacts of different seeds on a seeding substrate surface (a-c) and a membrane morphology (d-i), where a, d, and g are for Seed A; b, e, and h are for Seed B; and c, f, and i are for Seed C.

To investigate an impact of a crystal seed on seeding performance, an aqueous suspension with 0.5 wt % of zeolite particles was adopted for seeding of a hollow fiber substrate. SEM images of surfaces of substrates on which the crystal seeds were applied are shown in a to c of FIG. 2. The three crystal seeds all formed a continuous layer. It seems that the roughness of a crystal seed layer decreased gradually from the Seed A to the Seed C. It is speculated that the Seed A had an effective pore size merely of 300 nm, and thus was too large (660 nm) to effectively fill and smooth a substrate. Gaps among large crystals were filled with fragments of the ball-milled Seed B (zone b of FIG. 2). Due to an action of a capillary force, small particles would penetrate into a substrate. Crystals of the Seed C were tightly packed to form a uniform crystal seed layer (c of FIG. 2), which is a desired result of high-quality zeolite membrane formation. It should be noted that no zeolite crystals were observed inside the substrate, even if an average particle size of the crystals was smaller than an average pore size of the substrate (210 nm vs 300 nm). After 96 h of a hydrothermal treatment at 433 K, the three crystal seeds all formed a well-interconnected continuous membrane (d to f of FIG. 2). Membranes induced by the Seeds A and B had grain sizes of 4.1±1.2 μm and 3.8±1.0 μm, respectively. Interestingly, in the case of the Seed C, a gain size dropped to 2.7±0.3 μm. Since the Seed C served as a crystal nucleus, it could be assumed that a plurality of crystals grew simultaneously. However, once the crystals were fused together, growth would be limited by steric hindrance. The decrease of a membrane thickness from 8.1 μm of a membrane A to 2.8 μm of a membrane C (zones g to i of FIG. 2) can further prove the assumption of the present disclosure.

Figure 3:
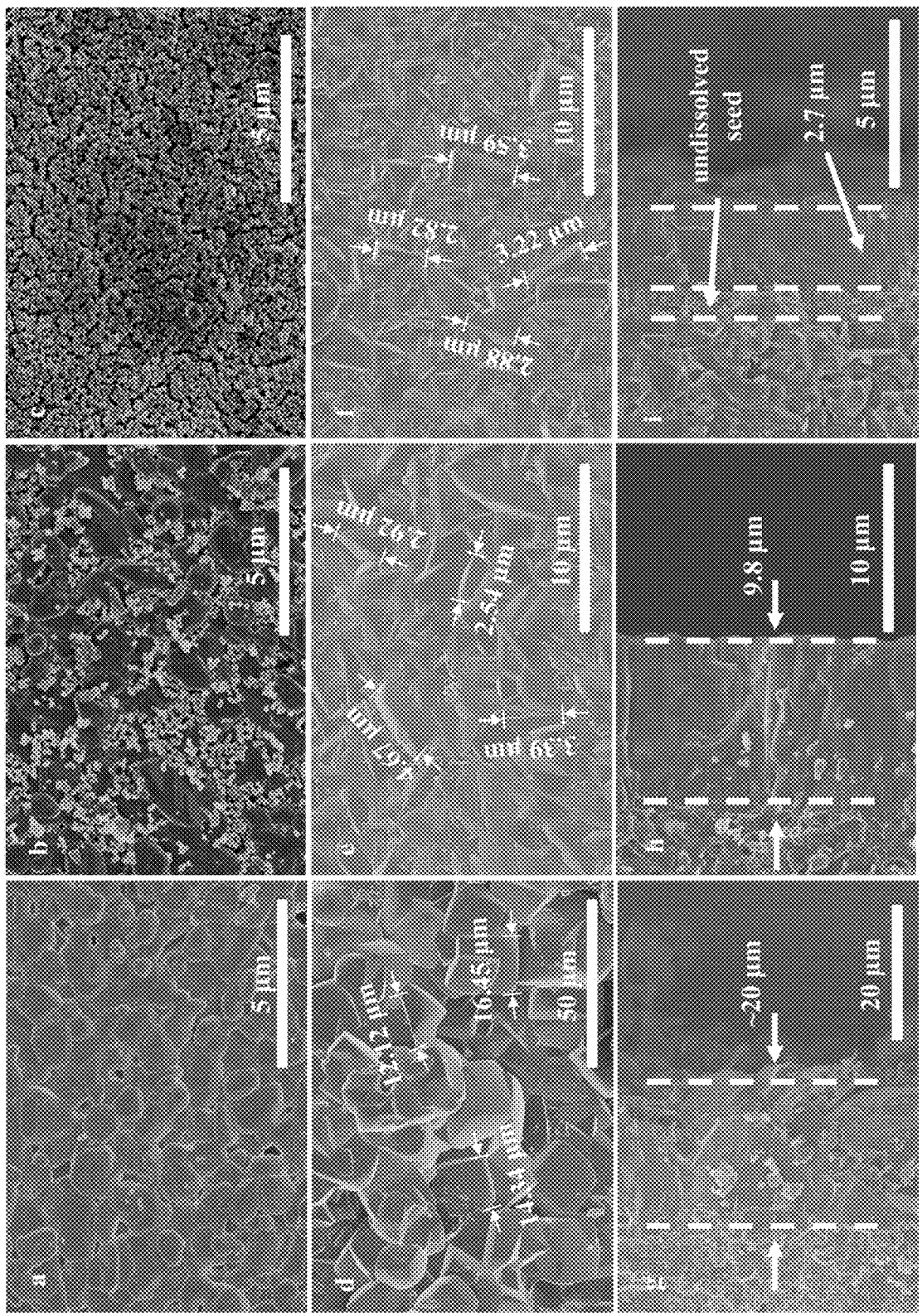
FIG. 3 shows impacts of the Seed C at different loads on a corresponding membrane morphology, where a, d, and g are for a crystal seed suspension concentration of 0 wt %; b, e, and h are for a seed suspension concentration of 0.1 wt %; and c, f, and i are for a crystal seed suspension concentration of 1 wt %.

To further confirm this assumption, SSZ-13 zeolite membranes were synthesized by loading the Seed C at different loads on a substrate, that is, suspensions respectively with 0 wt %, 0.1 wt %, and 1 wt % of the Seed C each were loaded on the substrate. An excellent interconnected membrane was formed on a bare substrate (a, d, and g of FIG. 3), but the membrane had a surface grain size of greater than 10 μm and a thickness of 20 μm. After a 0.1 wt % Seed C suspension was coated on a substrate to induce the growth of a membrane layer, a 9.8 μm-thick membrane C was formed on the substrate (b, e, and h of FIG. 3). Even a same crystal seed was adopted, a resulting membrane had a much larger grain size than the membrane C (3.2±1.1 μm vs 2.7±0.3 μm, zone f of FIG. 2). Interestingly, when a substrate was dip-coated with a 1.0 wt % crystal seed suspension, a resulting membrane had a similar morphology to the membrane C, regardless of a particle size (2.7±0.6 μm) and a thickness (2.7 μm) (c, f, and i of FIG. 3). This is reasonable because a substrate was completely covered by the Seed C in both cases (zone c of FIG. 2 vs zone c of FIG. 3).

Gas Test and Characterization

Single-gas permeation and mixed gas separation tests were conducted on a homemade wicke-kallenbach instrument. A feed flow was controlled at 75 mL·min$^{-1}$ by a mass flow controller. For mixed gas separation, a total feed flow was 150 mL·min$^{-1}$. A feed pressure (p) was controlled at 0.1 MPa to 1.2 MPa by a back pressure regulator. A temperature (T) was controlled at 303 K to 453 K by a convection oven.

An equimolar CO$_2$/CH$_4$ mixture separation method was used to evaluate a quality of a membrane at 0.1 MPa. Four membranes were synthesized at one time with each crystal seed, and CO$_2$/CH$_4$ separation performance of the four membranes is shown in Table 2. The optimal membrane performance induced by the Seeds A (M1 to M3) and B (M5 to M6) was comparable to the membrane performance in the literature. A natural gas promote criterion requires a CO$_2$/CH$_4$ selectivity of 20 to 30. However, a relatively-low selectivity (for example, 9 for M8 and 17 for M7) indicates poor repeatability, which is attributed to uneven loading of the crystal seeds described above (a to b of FIG. 2). This is mainly because a zeolite layer shrinks and an alumina substrate expands during calcination to form intergranular pores.

The four membranes induced by the Seed C all exhibited a CO$_2$/CH$_4$ selectivity of higher than 100 and an average CO$_2$ permeation rate of 5.2×10$^{-7}$ mol·m$^{-2}$·s$^{-1}$·Pa$^{-1}$. The increase in CO$_2$ permeability was consistent with a decrease in a thickness of a zeolite membrane as shown in the SEM images (zones g to i of FIG. 2). Table 3 summarizes the CO$_2$/CH$_4$ separation performance of membranes induced by the Seed C at different loads. An average CO$_2$ permeation rate of four membranes synthesized in situ (the Seed C, M13 to M16: zero load) was 1.85×10$^{-6}$ mol·m$^{-2}$·s$^{-1}$·Pa$^{-1}$, which was 3 times higher than the CO$_2$ permeation rate in Table 2. In combination with the poor selectivity of 1.6, the membranes were proved to be defective and unable to allow separation of CO$_2$ from CH$_4$. When a 0.1 wt % crystal seed suspension (M17 to M20) was adopted, an average selectivity increased to 49. An average CO$_2$ permeation rate of these membranes was 5.0×10$^{-7}$ mol·m$^{-2}$·s$^{-1}$·Pa$^{-1}$. When a crystal seed concentration increased to 1 wt %, a selectivity of membranes M21 to M24 further increased to 79, and although a comparable CO$_2$ permeation rate was reached, the selectivity was only half a selectivity of a membrane induced by a 0.5 wt % crystal seed suspension. The excess crystals of a crystal seed served as an intermediate layer, as shown in i of FIG. 3, which would result in a weak interaction between a zeolite layer and a substrate. In this case, defective pores were easily formed during template removal, conveying, and pressure-driven separation.

TABLE 2

Separation performance of membranes induced by different crystal seeds[a]

| No. | Crystal seed | $P_{CO_2}$[b] | $\alpha_{CO_2/CH_4}$[b] | $\overline{P_{CO_2}}$[b] | $\overline{\alpha_{CO_2/CH_4}}$[b] |
|---|---|---|---|---|---|
| M1 | Seed A | 3.4 | 138 | 2.8 ± 0.8 | 118 ± 51 |
| M2 | | 2.5 | 153 | | |
| M3 | | 3.6 | 138 | | |
| M4 | | 1.9 | 42 | | |
| M5 | Seed B | 3.8 | 147 | 4.0 ± 0.2 | 77 ± 74 |
| M6 | | 4.1 | 134 | | |
| M7 | | 4.2 | 17 | | |
| M8 | | 4.0 | 9 | | |
| M9 | Seed C | 5.7 | 134 | 5.2 ± 0.5 | 143 ± 7 |
| M10 | | 5.6 | 149 | | |
| M11 | | 4.8 | 146 | | |
| M12 | | 4.8 | 141 | | |

[a] a substrate was impregnated with a 0.5 wt % crystal seed suspension and then subjected to a hydrothermal treatment at 160° C. for 96 h; and
[b] measured at 0.2 MPa and 30° C., × $10^{-7}$ mol · $m^{-2}$ · $s^{-1}$ · $Pa^{-1}$.

TABLE 3

Impact of a Seed C concentration on $CO_2/CH_4$ separation performance[a]

| No. | Concentration/ wt % | $P_{CO_2}$[b] | $\alpha_{CO_2/CH_4}$[b] | $\overline{P_{CO_2}}$[b] | $\overline{\alpha_{CO_2/CH_4}}$[b] |
|---|---|---|---|---|---|
| M13 | 0 | 24.2 | 1.6 | 18.5 ± 7.8 | 1.6 ± 0.1 |
| M14 | | 8.2 | 1.6 | | |
| M15 | | 24.9 | 1.7 | | |
| M16 | | 16.9 | 1.5 | | |
| M17 | 0.1 | 4.7 | 41 | 5.0 ± 0.3 | 49 ± 11 |
| M18 | | 5.4 | 60 | | |
| M19 | | 5.1 | 38 | | |
| M20 | | 4.9 | 58 | | |
| M21 | 1.0 | 5.0 | 69 | 5.1 ± 0.4 | 79 ± 10 |
| M22 | | 5.4 | 82 | | |
| M23 | | 5.6 | 91 | | |
| M24 | | 4.7 | 75 | | |

[a] a membrane was hydrothermally synthesized at 160° C. for 96 h; and
[b] measured at 0.2 MPa and 30° C., × $10^{-7}$ mol · $m^{-2}$ · $s^{-1}$ · $Pa^{-1}$.

The formation of thermal cracks should be prevented in a top thin layer and an intermediate layer. Suitable calcination conditions are key factors for controlling the formation of defects. The membrane performance data in Table 2 show that small-size crystals are conducive to the interactive growth of crystals in a membrane layer. After high-temperature calcination, a zeolite membrane with stable performance can be obtained. Compared with the Seed C layer, the Seed A layer had a large interplanar crystal spacing, a long synthesis time is required for interactive growth of crystals to avoid the existence of large defects in a form of a membrane layer, and these defects are often amplified during subsequent calcination due to a thermal expansion difference between a membrane layer and a substrate, resulting in degradation of membrane performance. After ball-milling, a relative crystallinity of the Seed B decreased by 70%, which led to poor induction ability and thus made performance of a membrane unstable.

When a zeolite membrane grows in situ without the Seed C loaded, the growth of a membrane layer is controlled by the growth of a zeolite in a synthesis stock solution, the interactive growth of a membrane layer is poor, and the steric hindrance is low, resulting in internal discontinuity of the membrane layer. In this case, a resulting membrane has basically no gas separation effect. When a substrate is treated with a 0.1 wt % crystal seed suspension, the discontinuity of a surface of a crystal seed provides limited steric hindrance, and a thickness of a membrane layer can be reduced, but there are still defects in the membrane layer that are difficult to observe by naked eyes and amplified at a high temperature, and large defects cannot be well used for gas separation. After a 1 wt % crystal seed suspension is applied on a substrate, a continuous crystal seed layer is formed on the substrate like a 0.5 wt % crystal seed suspension, and after a hydrothermal treatment, a crystal seed will be dissolved and participate in the growth of a zeolite membrane. However, in this case, because a too-large amount of the crystal seed is loaded, a part of the crystal seed cannot be completely dissolved and thus retain to be sandwiched between the substrate and a membrane layer, which reduces an interaction force between the substrate and the membrane layer and leads to increased defects for membrane performance.

When a 0.5 wt % crystal seed suspension is applied on a substrate, a continuous crystal seed layer is formed on a surface of the substrate, and a thin membrane layer with excellent gas permeability and separation selectivity is formed under an action of spatial resistance, where there is no additional seed layer in a formed membrane. It can be seen that the limitation of a steric hindrance effect of a crystal seed on the growth of a membrane layer lies in that the seed completely covers a surface of a substrate and a load of the seed just allows the seed to completely cover the surface of the substrate. This means that, when an interplanar spacing of a nanoseed is small enough, a steric hindrance effect can be well exhibited. If there is an excess amount of a seed that does not fully participate in the growth of a membrane layer, it is not conducive to preparation of a high-quality zeolite membrane. Based on this theory, an SSZ-13 zeolite membrane with a thickness merely of 0.8 μm was prepared on a four-channel hollow fiber substrate with a pore size of 150 nm. Due to the presence of a thin membrane layer and the opposite thermal expansion of a substrate and a membrane layer, a thermal stress generated during a high-temperature treatment led to defects of the membrane layer. During a subsequent scale-up production process of an SSZ-13 membrane, a zeolite membrane layer with a specified thickness helped to compensate a thermal stress during high-temperature calcination, thereby ensuring preparation of a high-performance zeolite membrane.

Synthesis Time Optimization

An SSZ-13 zeolite membrane was synthesized under different synthesis times (2 h to 72 h) to track a membrane-forming process. Before hydrothermal synthesis, a substrate was dip-coated with a 0.5% Seed C suspension as described above. 2 h after a hydrothermal treatment, a typical cubic morphology of the Seed C became blurred. In addition, the crystal seed was surrounded by a silica oligomer, which usually occurs at an initial stage of crystal growth. A crystal increased in the size with the prolongation of a synthesis period. At 6 h of synthesis, a resulting membrane had a surface grain size of 0.42 μm, but there was a lack of interconnection among crystals (a and d of FIG. 4). At 10 h of synthesis, crystals were well interconnected to form a continuous layer (zones b and e of FIG. 4).

Figure 4:
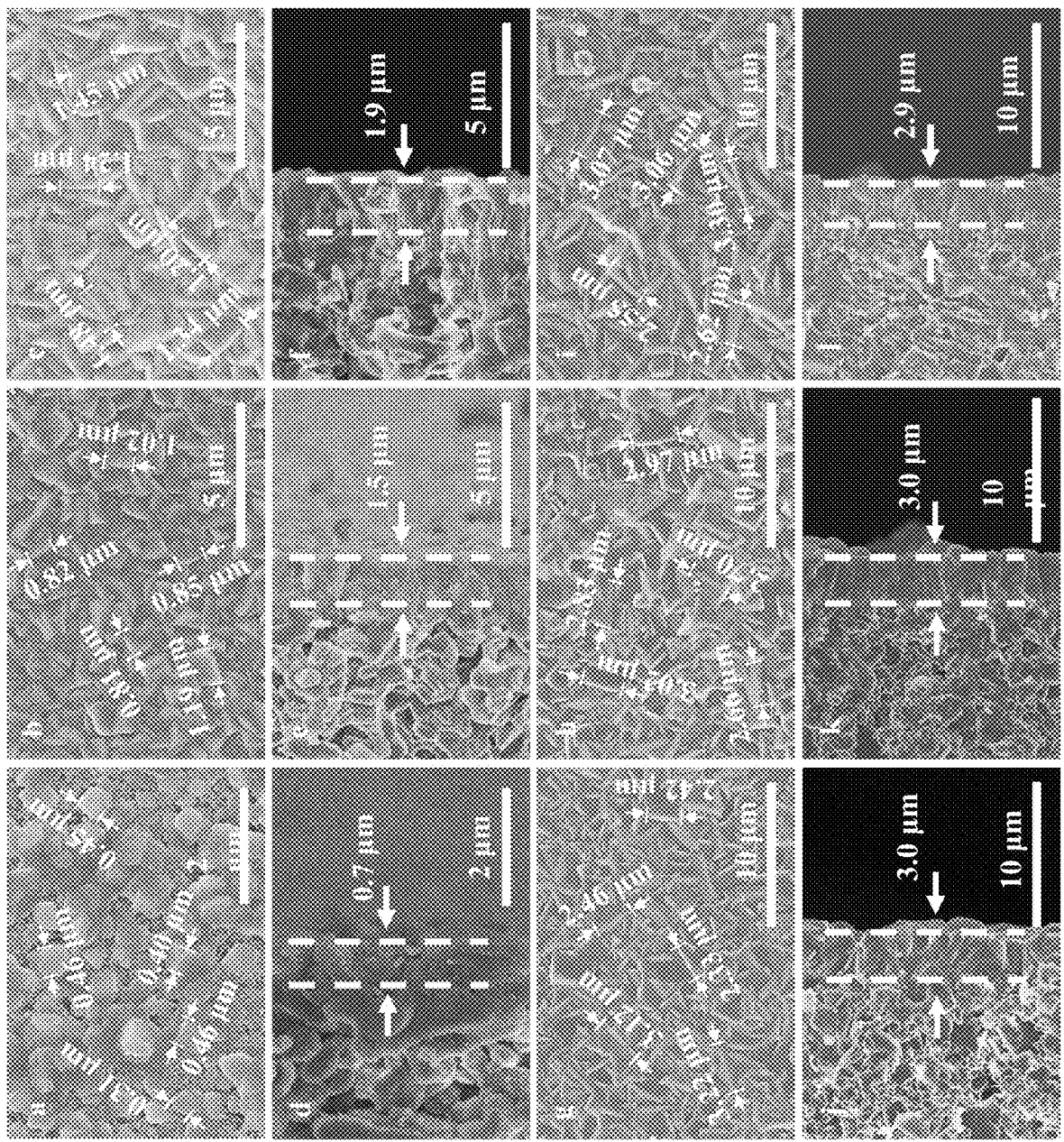
FIG. 4 shows SEM images of zeolite membranes obtained with different synthesis times, where a and d are surface and cross-section images of an SSZ-13 zeolite membrane synthesized at 433 K with a synthesis time of 6 h, respectively; b and e are surface and cross-section images of an SSZ-13 zeolite membrane synthesized at 433 K with a synthesis time of 10 h, respectively; c and f are surface and cross-section images of an SSZ-13 zeolite membrane synthesized at 433 K with a synthesis time of 18 h, respectively; g and i are surface and cross-section images of an SSZ-13 zeolite membrane synthesized at 433 K with a synthesis time of 24 h, respectively; h and k are surface and cross-section images of an SSZ-13 zeolite membrane synthesized at 433 K with a synthesis time of 48 h, respectively; and i and l are surface and cross-section images of an SSZ-13 zeolite membrane synthesized at 433 K with a synthesis time of 72 h, respectively.

A thickness of the membrane also increased from 0.7 μm at 2 h of synthesis to 1.9 μm at 18 h of synthesis (c and f of FIG. 4). Interestingly, once a synthesis time exceeded 24 h, a morphology of the membrane would not change regardless of a particle size and a thickness (g to l in FIG. 4). Three membranes were synthesized under each synthesis time (24 h, 48 h, 72 h, and 96 h) and subjected to SEM analysis. In fact, all membranes had a thickness of about 3.0 µm, verifying the reliability.

Figure 5:
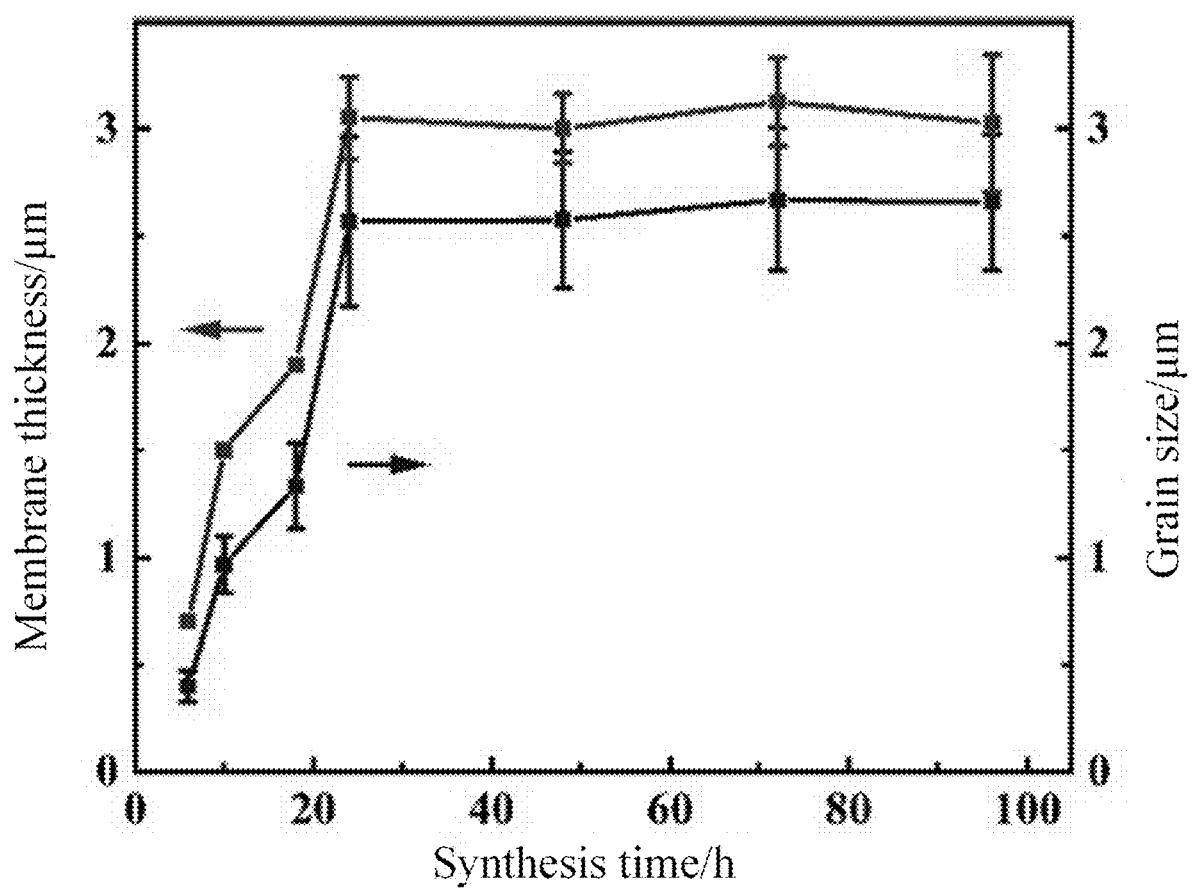
FIG. 5 shows an impact of a synthesis time on a grain size and a membrane thickness.

In FIG. 5, curves of the grain size and the membrane thickness as a function of the synthesis time are further plotted. The particle size and the membrane thickness increase linearly with the synthesis time, and then tend to be unchanged. Obviously, an inflection point for the Seed C is at 24 h, which is defined as a critical time for growth of a zeolite membrane. Even when a high-selectivity membrane is synthesized, if a synthesis time exceeds this critical value, the reproducibility will also be significantly improved. As shown in Table 4, with the increase of the synthesis time in a range of 24 h to 72 h, the $CO_2/CH_4$ separation selectivity increases from 77±36 at 24 h to 101±6 at 72 h, which can support the above hypothesis. At 24 h of synthesis, a membrane layer is basically interacted and grows completely, and a resulting membrane has specified separation performance and is suitable for industrial applications. With the extension of a synthesis time and the repair of membrane defects, an SSZ-13 zeolite membrane synthesized under a synthesis time of 96 h exhibited excellent membrane performance and membrane-producing reproducibility, which is conducive to the subsequent scale-up preparation of the zeolite membrane.

TABLE 4

Separation performance of zeolite membranes synthesized under different synthesis times

| No. | Synthesis time/h | $P_{CO_2}^b$ | $\alpha_{CO_2/CH_4}^b$ | $\overline{P_{CO_2}}^b$ | $\overline{\alpha_{CO_2/CH_4}}^b$ |
|---|---|---|---|---|---|
| M25 | 24 | 4.8 | 29 | 4.8 ± 0.3 | 77 ± 36 |
| M26 |  | 4.4 | 77 |  |  |
| M27 |  | 4.9 | 113 |  |  |
| M28 |  | 5.1 | 88 |  |  |
| M29 | 48 | 5.0 | 117 | 4.4 ± 0.5 | 81 ± 27 |
| M30 |  | 4.1 | 53 |  |  |
| M31 |  | 4.6 | 77 |  |  |
| M32 |  | 4.0 | 75 |  |  |
| M33 | 72 | 4.2 | 95 | 4.6 ± 0.3 | 101 ± 6 |
| M34 |  | 4.9 | 105 |  |  |
| M35 |  | 4.8 | 108 |  |  |
| M36 |  | 4.7 | 97 |  |  |

[a] a membrane was hydrothermally synthesized at 160° C. for 96 h; and
[b] measured at 0.2 MPa and 30° C., × $10^{-7}$ mol · $m^{-2}$ · $s^{-1}$ · $Pa^{-1}$.

Mechanism of Formation of a Membrane

Figure 6:
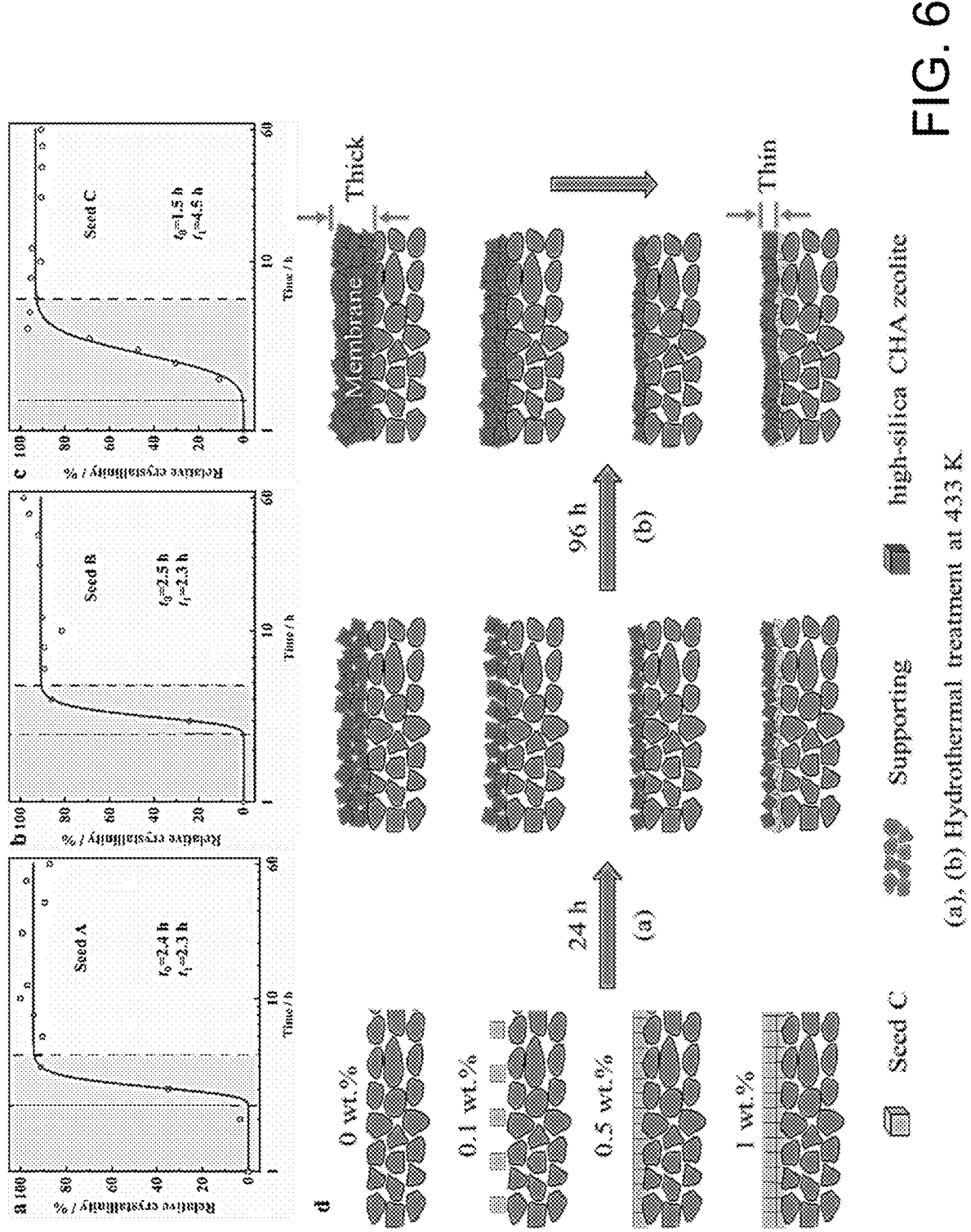
FIG. 6 shows crystallization curves and a schematic diagram of formation of a zeolite membrane, where a to c show the crystallization curves of the Seeds A, B, and C, respectively; d is the schematic diagram of formation of a zeolite membrane; a yellow zone represents an induction period (to); and a blue zone represents a crystallization period ($t_1$).

To compare the induction performance of the Seeds A, B, and C, kinetic crystallization curves of the Seeds A, B, and C were investigated. Based on a mass of $SiO_2$ in a synthesis solution, the synthesis solution including 1.4 wt % of a crystal seed was used to conduct a hydrothermal treatment for a specified period of time, and a product was collected and tested for a relative crystallinity. An induction period for the Seed A was 2.4 h, and an induction period for the Seed B was 2.5 h (zones a and b of FIG. 6). Typically, the formation of an oligomer and the dissolution of a crystal seed begin to evolve at this stage. An induction period for the Seed C was 1.5 h (zone c of FIG. 6), which may be due to a large external surface area of the Seed C. A crystallization period for the Seed C was 4.5 h, almost twice crystallization periods of the Seeds A and B. Due to a same weight percentage and a small particle size of the Seed C, a number of crystals produced from the Seed C was almost an order of magnitude higher than a number of crystals produced from the Seed A. In this case, a concentration of the Seed C decreased rapidly. A short induction time indicates that, compared with the Seeds A and B, an interconnected layer was formed by the Seed C to cause the rapid growth of crystals, such that single crystals underwent excellent interactive growth to produce an SSZ-13 zeolite membrane with excellent separation performance. Since a nano-scale crystal seed has a larger external surface area and worse hydrothermal stability than micro-scale zeolite, the nano-scale crystal seed can produce more nucleation sites per unit time than the micro-scale zeolite, such that an induction period controlling a crystal growth rate can be shortened and the crystal growth can be completed in a short period of time. Since the overgrowth of a membrane layer is inhibited by steric hindrance to varying degrees, zeolite membranes with different thicknesses were finally obtained. This phenomenon was particularly obvious during membrane formation induced by the Seed C at different concentrations, as shown in d of FIG. 6. With the induction of a zeolite membrane by a 0.5 wt % Seed C suspension as an example, a microscopic process from a crystal seed to a membrane is demonstrated. Zeolite crystallization processes in an induction period, a crystallization period, and a white region in c of FIG. 6 correspond to membrane growth processes in (d) of FIG. 6, respectively.

What is claimed is:

1. A preparation method of an SSZ-13 zeolite membrane, comprising the following steps:
   step 1: subjecting a FAU-type USY zeolite to a hydrothermal reaction under an action of a structure-directing agent to obtain a high-silica CHA zeolite, separating the high-silica CHA zeolite, and calcining the high-silica CHA zeolite to obtain a crystal seed; and
   step 2: preparing the crystal seed into a crystal seed suspension, and applying the crystal seed suspension to a surface of a substrate; and placing the substrate in a synthesis solution to allow hydrothermal synthesis, and calcining the substrate after the hydrothermal synthesis to remove a template agent, to obtain the SSZ-13 zeolite membrane,
   wherein the SSZ-13 zeolite membrane has a thickness of 1 µm to 5 µm; and
   the structure-directing agent is N,N,N-trimethyl-1-adamantane ammonium hydroxide (TMAdaOH),
   wherein during the hydrothermal reaction in the step 1, the FAU-type USY zeolite serves as a silicon source and an aluminum source, and a molar ratio of components in a reaction solution is 100 $SiO_2$:1.25 $Al_2O_3$:(300-500) TMAdaOH:(400-600) $H_2O$.

2. The preparation method of the SSZ-13 zeolite membrane according to claim 1, wherein the hydrothermal reaction in the step 1 is conducted at 150° C. to 200° C. for 10 days to 20 days.

3. The preparation method of the SSZ-13 zeolite membrane according to claim 1, wherein the calcining in the step 1 is conducted at 550° C. to 650° C. for 5 h to 20 h with a heating rate of 1° C./min to 5° C./min.

4. The preparation method of the SSZ-13 zeolite membrane according to claim 1, wherein in the step 2, the crystal seed suspension has a concentration of the crystal seed of 0.1 wt % to 1 wt %, during the applying, a contact time between the crystal seed suspension and the substrate is 1 s to 30 s, and the substrate is a porous ceramic.

5. The preparation method of the SSZ-13 zeolite membrane according to claim 1, wherein in the step 2, the hydrothermal synthesis is conducted at 140° ° C. to 180° C. for 70 h to 120 h.

6. The preparation method of the SSZ-13 zeolite membrane according to claim 1, wherein in the step 2, a molar ratio of components in the synthesis solution is 100 $SiO_2$:(0.45-0.55) $Al_2O_3$:(15-25) TMAdaOH:(8-16) $Na_2O$:(3,500-5,500) $H_2O$; and in the step 2, the calcining to remove the template agent is conducted at 450° C. to 500° C. for 12 h to 36 h with heating and cooling rates both of 0.2° C./min to 1° C./min.

\* \* \* \* \*